(12) United States Patent
Collet et al.

(10) Patent No.: US 7,840,550 B2
(45) Date of Patent: Nov. 23, 2010

(54) SYSTEM AND METHOD FOR MONITORING DATABASE QUERIES

(75) Inventors: Jean-Luc Collet, La Gaude (FR); Francois-Xavier Drouet, Nice (FR); Carole Truntschka, St. Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 1647 days.

(21) Appl. No.: 10/639,373

(22) Filed: Aug. 12, 2003

(65) Prior Publication Data

US 2005/0027698 A1    Feb. 3, 2005

(30) Foreign Application Priority Data

Aug. 13, 2002    (EP) .................................. 02368089

(51) Int. Cl.
*G06F 7/00* (2006.01)
*G06F 17/30* (2006.01)

(52) U.S. Cl. ........................ 707/713; 707/736; 707/758; 707/769

(58) Field of Classification Search ..................... 707/3, 707/1; 709/219
See application file for complete search history.

(56) References Cited

U.S. PATENT DOCUMENTS

| | | | |
|---|---|---|---|
| 6,879,979 B2 * | 4/2005 | Hindawi et al. ................. 707/3 |
| 2003/0191752 A1 * | 10/2003 | Fairweather .................... 707/3 |
| 2003/0225862 A1 * | 12/2003 | Watanabe et al. ........... 709/219 |

\* cited by examiner

*Primary Examiner*—John E Breene
*Assistant Examiner*—Giovanna Colan
(74) *Attorney, Agent, or Firm*—Andrea Bauer; Hoffman Warnick LLC

(57) ABSTRACT

A queries management system to be accessed by a user submitting queries against databases. The system comprises a system for defining a set of parameters associated to the user and including user profile parameters and queries structure parameters, a notifications storing system for storing results availability notifications, and a results storing system for storing database queries results. The queries management system further comprises a control system coupled to the defining system and to the storing system for controlling the queries submissions against the databases using the user profile parameters and the queries structure parameters defined for the user, for controlling the results availability notifications using the user profile parameters defined for the user, and for controlling the database queries results histories based on the user profile parameters defined for the user.

23 Claims, 4 Drawing Sheets

SYSTEM AND METHOD FOR MONITORING DATABASE QUERIES

TECHNICAL FIELD

The present invention relates to database queries in general and in particular to a system and method for monitoring and scheduling relational database queries and performing notification of results availability.

BACKGROUND OF THE INVENTION

A database is a collection of data structured and organized in a disciplined fashion, that makes stored information of interest more quickly available. When a database is organized and accessed according to relationships between stored items, it is referred as a relational database. A relational database program allows the user to create, modify and submit queries to the relational database, and view the results after processing.

An example of a complex relational database is a database used by scientists working on life sciences, which stores gene structures, gene information and protein compounds.

Although relational database programs offer many advantages to manage user queries, the inherently strong relations that may be established between several tables for specific queries may require long processing times and result in erratic response times, especially for large databases. Consequences may be unnecessary expense and resource waste, and user dissatisfaction.

The following patents and commercial solutions illustrate some proposals to address the problem of long duration processes.

U.S. Pat. No. 6,026,424 to Circenis discloses a method and system for switching long duration tasks from synchronous to asynchronous execution and for reporting task results in a client/server process environment. A client process in a computer system opens a communication channel to a server process in the computer system and instructs the server process to execute a task. The server process starts a timer when it begins execution of the task, to determine whether the task is of short or long duration. If the task completes before the timer reaches a predetermined value, the server process reports task completion to the client process on the open communication channel. If the task does not complete before the timer reaches the predetermined value, the server process closes the communication channel to preserve system resources and continues executing the task asynchronously. When the task is complete, the server process reopens a communication channel and reports task completion to the client process. Results are transmitted directly to the client process only if they are smaller than a predetermined size, otherwise, they are stored in a cache to preserve system resources. The client can then request the results when it is ready to receive them.

U.S. Pat. No. 6,041,327 to Glitho et al. discloses a mechanism for supporting the generation by a server relational database, and the sending from that server relational database to a client, of a notification regarding accesses in the database indicative of the occurrence of certain events of interest.

The DB2 Query Patroller product available from the Assignee is a tool for managing access to Decision Support Systems that accepts, analyzes, prioritizes, and schedules DB2 database requests and optionally notifies users when their DB2 requests have been processed. One of the limitations of this solution is that the server executes only on one type of relational database, namely, a DB2 database. Moreover, the notification of results availability is obtained in this solution, checking through an administrator reserved tool detailed information about the query submitted.

SUMMARY OF THE INVENTION

In view of the foregoing and other problems of the conventional systems and methods, it is an object of the invention to provide a generic solution for monitoring database queries and for providing notification of results availability.

It is another object of the invention to provide a multi-node, multi-platform system that is not limited to a specific number and/or type of database.

Another object of the invention is to provide a system that manages users' profiles for further queries submission.

Yet another object of the invention is to provide a system that maintains queries results and results histories for further use.

The present invention provides a queries management system to be accessed by a user submitting queries against databases, comprising means for defining a set of parameters associated with the user and including user profile parameters and queries structure parameters, notifications storing means for storing results availability notifications, and results storing means for storing database queries results. The system further comprises control means coupled to the defining means and to the storing means for controlling the queries submissions against the databases using the user profile parameters and the queries structure parameters defined for said user, for controlling the results availability notifications using the user profile parameters defined for said user, and for controlling the database queries results histories based on the user profile parameters defined for said user.

The user profile parameters may comprise scheduling attributes to indicate timings of queries submissions, destination attributes and type attributes to indicate at least one destination address and one device of a user to receive the results availability notifications.

The queries structure parameters may comprise at least database access attributes to indicate the type of databases to access.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
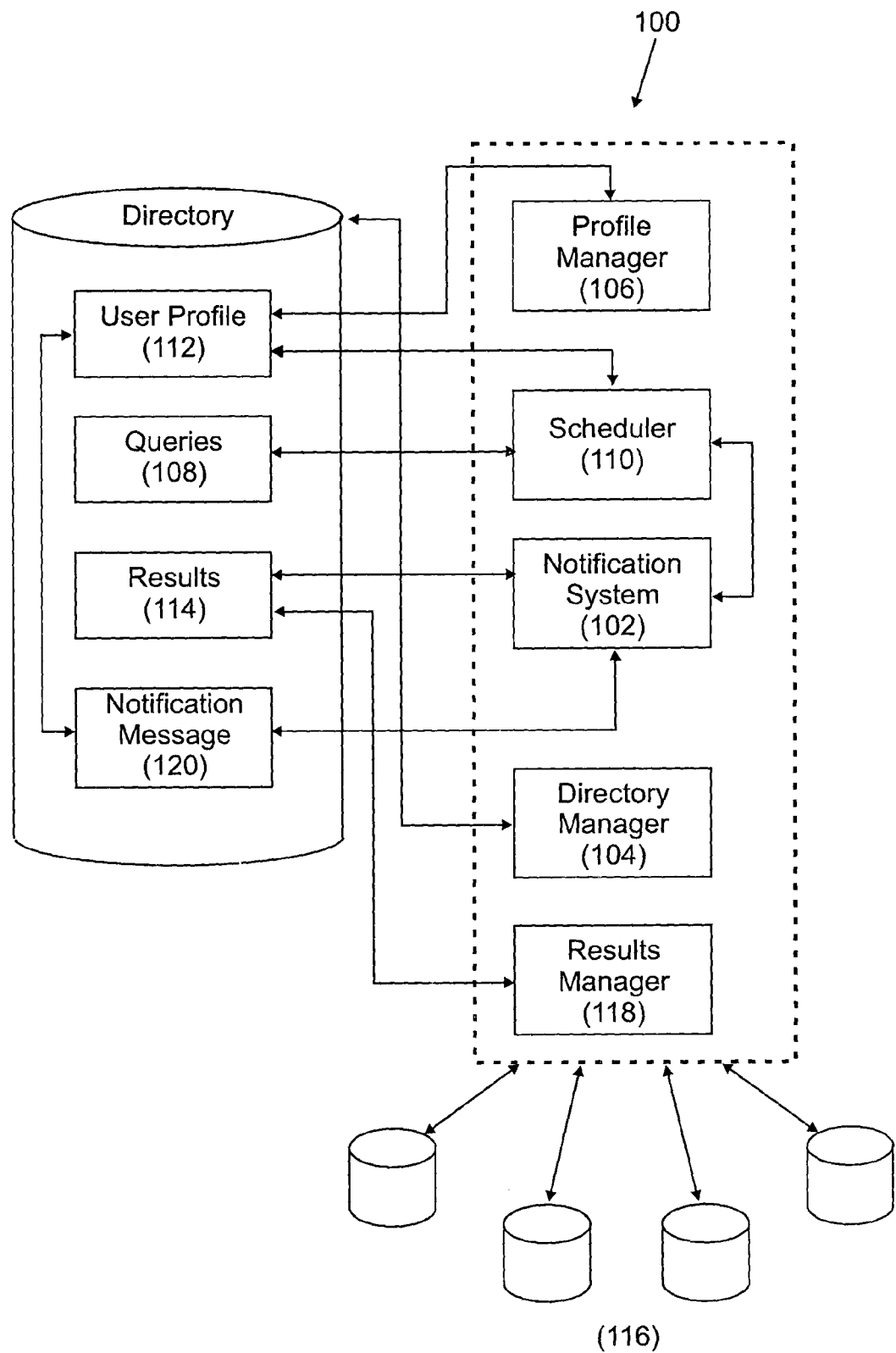
FIG. 1 is a conceptual view of an implementation of the system of the present invention.

FIG. 1 shows a general view of the system 100 of the present invention. The system 100 comprises a Queries structure 108 containing the users queries to be submitted to a relational database 116.

A Profile Manager block 106 is coupled to a User Profile structure 112 and allows a user to formally describe the elements constituting a given user profile. A Scheduler block 110 coupled to a Notification System block 102 manages the submission of queries to the relational database 116 based on information contained in the Queries structure 108 and in the User Profile structure 112. The Notification System block 102 informs the user of the availability of results stored into a Results structure 114.

A Notification Message structure 120 contains results availability notifications formatted according to the User Profile structure 112 and the Results structure 114.

A Directory Manager block 104 allows management of the User Profile structure 112 at a user level and also at a users group level having a plurality of users. Furthermore, the Directory Manager block 104 also manages the Queries structure 108 and the Results structure 114 both at a user level and at a users group level.

A Results Manager block 118 provides the user with a way to manage the Results structure 114 in terms of result deletion or result archiving, and also in terms of providing a chronological account of events as it will be further explained with reference to FIG. 4.

The User Profile structure 112 includes scheduling parameters and instructions related to the Queries structure. User Profile structure 112 also contains notification parameters for formatting the Notification Message structure 120. The notification parameters may include a definition of the notification type to be used, whether a user or a users group is to be sent the notification, and the related destination address or phone number of the destination. For example, a set of notification parameters such as:

'NO RESULTS', 'SMS', user1 0688888888, users group II is used by the Notification System block 102 to send a Short Message System (SMS) message to 'user1' and to 'users group II' through SMS, indicating that results are available in the Results structure 114. In this example, no detail on the results is provided in the message.

One skilled in the art will easily appreciate that a plurality and variety of notification parameters and scheduling parameters may be defined and have a wide variety of actions, such as generating queries at night only, sending an Internet message to the user at address user@internetdomain.com with or without complete or partial results included in it, or actions such as rescheduling predefined queries.

The Queries structure 108 includes queries content parameters and database access parameters to be used for the query submissions to the relational database 116, in terms of content and access. For example, a database address such as 'GENOMEUS.COM' is accessed using a specific Java DataBase Connectivity driver (for example the JDBC™ driver from Sun Microsystems) with 'USER1/PASSWORD1' performing a Structured Query Language (SQL) query written as 'SELECT*FROM GENOMEUS'.

One skilled in the art will easily appreciate that a plurality and variety of queries content and database access parameters may be defined, and that queries submissions may be generated to any type of databases, such as relational/non relational database, flat file, etc.

The Results structure 114 contains formatted results provided by the relational database 116 after the queries submission and the queries processing.

The Scheduler block 110 is a process that manages the queries submission to the relational database 116. The Scheduler block 110 issues information as to the time and date of the queries from the User Profile structure 112 and submits the queries to the relational database 116 using the Queries structure 108. The Scheduler block 110 dynamically informs the Notification System block 102 of the availability of the results stored into the Results structure 114.

As previously stated, the Profile Manager block 106 manages the User Profile structure 112 and allows the user to formally describe the elements to compose a given user profile. It allows a user to completely create or update or enrich directly a user profile as it will be further detailed with reference to FIG. 3.

The Notification System block 102 is a process starting on a request issued from the Scheduler block 110. This process allows the user to be informed of the availability of results in the Results structure 114. The Notification System block 102 allows the formatting of a notification message based on parameters stored into the User Profile structure 112, and if requested, based on the Results block 114. The Notification System block 102 also offers a way to redirect a notification message to another user or to another device.

One skilled in the art will easily appreciate that a plurality of message formats as well as different message supports may be generated by this process, such as Simple Message Transfer Protocol (SMTP) message, Short Message System (SMS), phone, Wireless Access Protocol (WAP) push, instant messaging, etc.

The Results Manager block 118 allows the user to manage the Results structure 114, as it will be further detailed with reference to FIG. 4.

Finally, the Directory Manager block 104 allows access to system 100 and maintains all contained data in a consistent and controlled manner, and may be a commercially available standard server such as a Lightweight Directory Access Protocol (LDAP) server.

Figure 2:
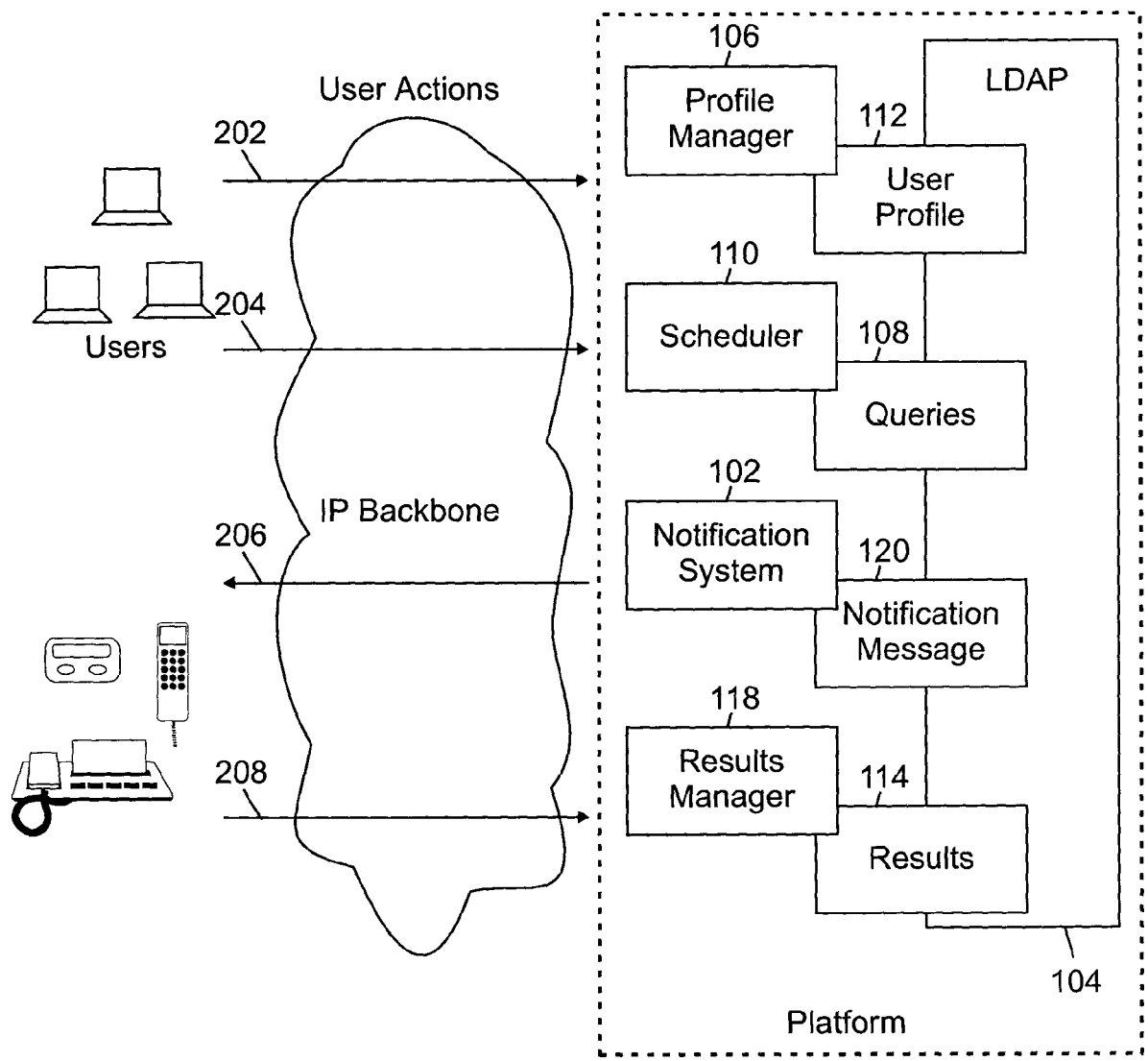
FIG. 2 illustrates the main actions for operating the system of the present invention.

Referring to FIG. 2, the main actions to operate the system of the present invention are now described.

A user may access the queries management system 100 through an IP backbone. It is to be appreciated that the hardware environment of system 100 is independent of its operation and that the previously described blocks and structures may be installed either on a unique machine connected to the IP backbone, or may be dispatched on several physical machines interconnected via the IP backbone.

As a first step 202, a user using the Profile Manager block 106 formally describes the elements constituting a User Profile structure 112 dedicated to that user. At this time, this User Profile structure is dedicated by the Directory Manager block 104, to the user. If the user is already defined in an internal database of the Directory Manager block, the user is already attached to a users group. If not, the user is asked to choose a users group to be related to during the saving option.

As a second step 204, the user formally describes the elements constituting the Queries structure 108 dedicated to that user. At the same time, this Queries structure 108 is controlled by the Directory Manager block 104, at the user level and also at the users group level. Then, the Scheduler block 110 manages the submission of queries to the relational database 116.

The queries are submitted to the relational database 116 and processed. Then, the Scheduler block 110 formats the Results structure 114 with results provided by the relational database 116. On request of the Scheduler block 110, the Notification System block 102 formats the Notification Message 120, based on notification parameters found in the User Profile structure 112 and if required by the user based on the Results Structure 114.

Then, as a third step 206, the Notification System block 102 sends the Notification Message 120 to the user, on the designated receiving notification device that has been defined by the notification parameters for the respective user.

As a fourth step 208, the user, using the Results Manager block 118, interacts with his dedicated Results structure 114, to view the results available in the Results structure 114, then archives them or links them to previous results already available in the Results structure 114.

Figure 3:
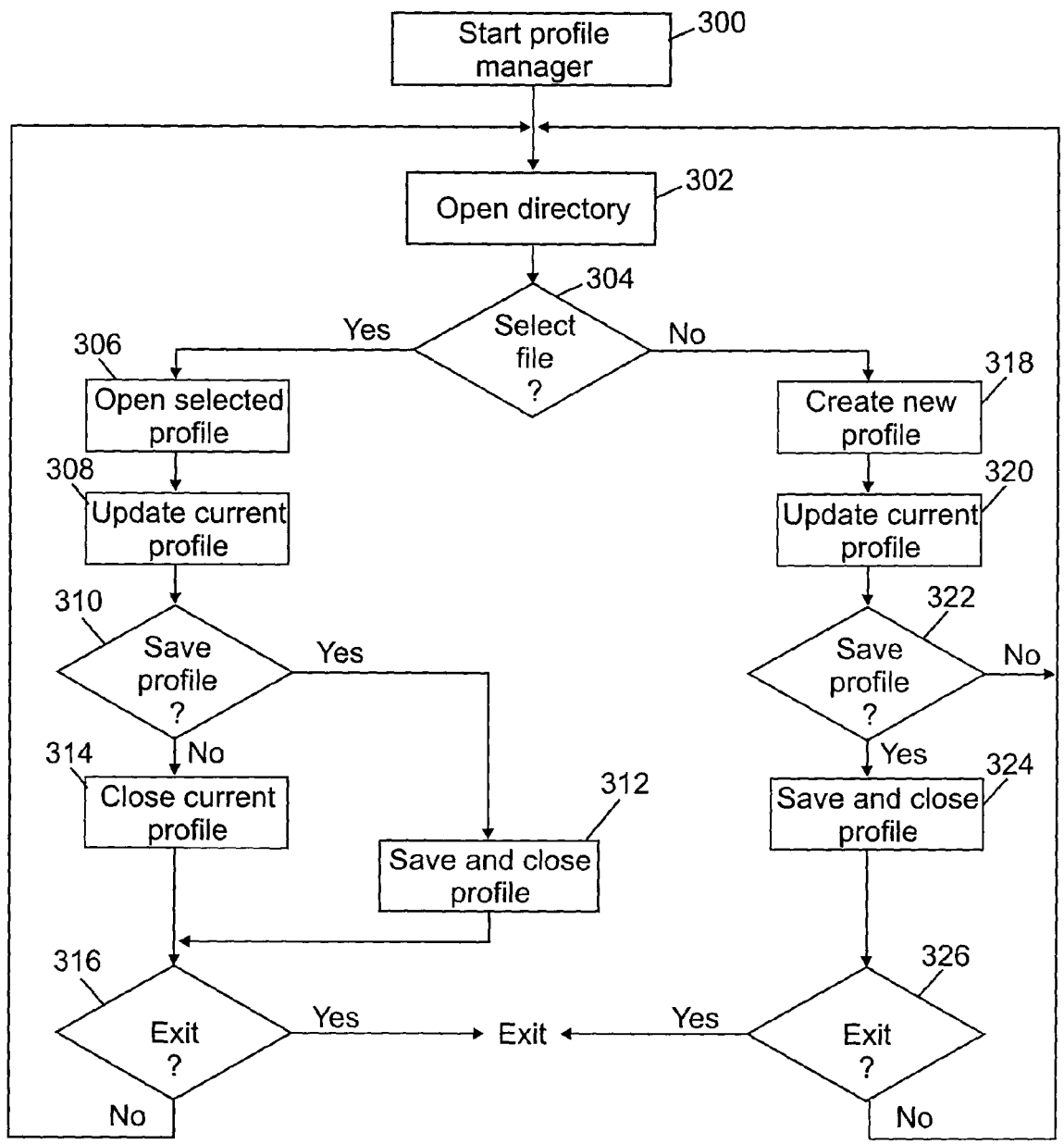
FIG. 3 is a flow chart of the main steps for a user to operate the Profile Manager of the present invention.

FIG. 3 illustrates the main steps for a user to operate the User Profile Manager block 106 of the present invention.

The process starts on step 300 with a user activating the User Profile Manager program. On next step 302, the process allows the user to access all of the user profile structures previously defined or installed and saved into the user profile directory.

Then, step 304 allows the user to select one particular user profile structure in the active directory.

If a user profile structure is selected (branch YES), then step 306 opens the selected user profile structure.

Next step 308 allows the user to modify the selected user profile structure. Then, step 310 allows the user to save the previously modified user profile structure.

If the save option is selected (branch YES), in step 312 the routine saves the updated user profile structure and closes it. If the save option is not selected (branch NO), then in step 314 the current opened user profile structure is closed without saving it.

Then, either from step 312 or step 314, the routine goes to step 316 to test if the user has selected the exit option during the edition. If Yes, then the process exits, otherwise the process loops back directly to step 302.

Going again to step 304, if no user profile structure is selected (branch NO), the user profile manager routine offers the user the possibility to create a new user profile structure in step 318.

Then, step 320 allows the user to add into the new user profile structure the chosen attributes such as the queries scheduling parameters and instructions, the notification parameters for the notification message content, the definitions as to the notification type to be used, as to the user ID or users group ID to send the notifications to, i.e., the related destination address or ID number.

Step 322 allows the user to save the newly created user profile structure.

If the save option is not selected (branch NO), the process loops back directly to step 302 without adding the new user profile structure into the active directory.

If the save option is selected (branch YES), then in step 324 the routine saves into the User Profile block the updated user profile structure and closes it. The routine goes next to step 326 to test if the user has selected the exit option during the edition. If Yes, then the process exits, otherwise the process loops back directly to step 302.

Figure 4:
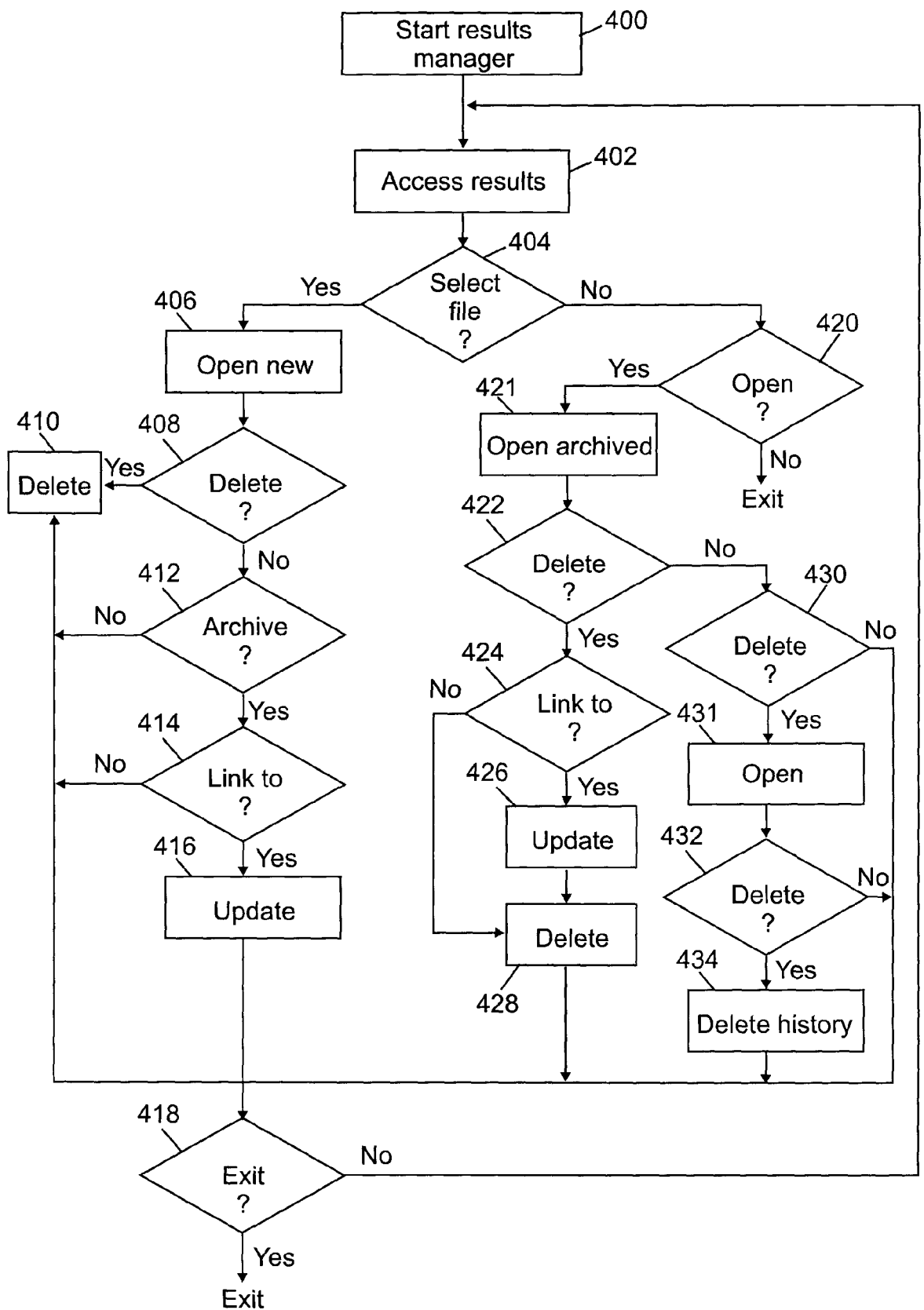
FIG. 4 is a flow chart of the main steps for a user to operate the Results Manager as defined by the present invention.

Referring now to FIG. 4, the main steps to use the Results Manager block 118 as defined by the present invention are described.

The process starts on step 400, with the user starting the Results Manager block. On next step 402, the process allows the user to access all the results structures dedicated to his user ID found into the results directory.

Next step 404 allows the user to select a particular results structure in the active directory.

If a result structure is selected (branch YES), next step 406 opens the results structure for viewing.

Next, on step 408, if the user selects a result deletion action (branch YES), the result structure is deleted on step 410 and the process goes directly to step 418 to exit the Result Manager. If the result deletion action is not selected, the viewed results structure may be archived by the user on step 412. If the user does not archive the result structure, the process goes directly to step 418 to exit.

If the user archives the results structure previously viewed (branch YES), then on step 414 the process allows the user to link the results structure to an existing results history or to create a new one. If no link is established or if no new history is created, the process exits (step 418), otherwise on step 416 the new history is created or the linked one is updated, and the process finishes with step 418.

Going again to step 404, if no results structure is selected (branch NO), next step 420 allows the user to open an archived results structure. If no archived results structure is selected for viewing, the process exits, otherwise if an archived results structure is selected (branch YES), the selected archived results structure is opened on step 421. Then, step 422 allows the user to delete the previously selected archived results structure.

If the user selects a deletion action (branch YES), the process tests on step 424 if the selected archived results structure is linked to a results history. If yes, the process automatically updates the related results history (step 426). And on step 428, the archived results structure is deleted. Process next ends on step 418.

Going back to step 422, if the user does not delete the archived results structure, the process allows him to access the related results history, if existing. If the user does not want to access the results history, or if it does not exist, the process goes to exit step 418. However, if the user wants to access the existing results history, then on step 431, the process opens it.

Next, on step 432, the process allows the user to perform a results history deletion. If not, the process goes to step 418. If yes, the results history and all the related results structures are deleted on step 434.

Finally, on step 418, if the user selects to exit the Result Manager block during the routine results management (branch YES), then the process effectively exits. Else, the process loops back directly to step 402.

One skilled in the art will easily appreciate that this routine automatically closes the results structures and results histories opened for viewing before exiting or looping back to step 402.

Thus, it is to be appreciated by those skilled in the art that while the invention has been particularly shown and described with reference to a preferred embodiment thereof, various changes in form and details may be made without departing from the spirit and scope of the invention. Particularly, it could be helpful to offer a structure that allows the user to formally describe the Queries structure 108 with a Structured Query Language (SQL) semantic help.

The invention claimed is:

1. A queries management system to be accessed by a user submitting queries against databases, comprising:
   means for defining a set of parameters associated with the user, the set of parameters including user profile parameters and queries structure parameters, wherein the user profile parameters include scheduling attributes to indicate timings of queries submissions, destination attributes to indicate at least one destination address of the user, and type attributes to indicate at least one destination device for the user to receive a results availability notification, and wherein the queries structure parameters include at least database access attributes to indicate the type of databases to access;
   notifications storing means for storing results availability notifications;

results storing means for storing database queries results; and control means coupled to the defining means and to the storing means for controlling:

the queries submissions against the databases using the user profile parameters and the queries structure parameters defined for said user;

the results availability notifications using the user profile parameters defined for said user; and database queries results histories based on the user profile parameters defined for said user.

2. The system of claim 1 wherein the control means further comprise means for formatting the results availability notifications.

3. The system of claim 1 wherein the control means further comprise means for formatting the database queries results.

4. The system of claim 1 further comprising parameters storing means coupled to the defining means for storing the user profile parameters and the queries structure parameters.

5. The system of claim 4 further comprising means coupled to parameters storing means for modifying at least one parameter of the user profile parameters.

6. The system of claim 4 further comprising means coupled to the parameters storing means for modifying at least one parameter of the queries structure parameters.

7. The system of claim 4 further comprising means coupled to the parameters storing means for deleting at least one parameter of the user profile parameters.

8. The system of claim 4 further comprising means coupled to the parameters storing means for deleting at least one parameter of the queries structure parameters.

9. The system of claim 1 wherein the means for controlling the database queries results histories further comprise means for modifying said database queries results histories.

10. The system of claim 1 wherein the means for controlling the database queries results histories further comprise means for deleting at least one history of said database queries results histories.

11. The system of claim 1 used in a distributed data processing environment by a group of users submitting queries to a plurality of different types of databases.

12. A computer program product stored on a computer readable storage medium, which when executed, manages database queries, comprising computer readable code configured to:

define a set of parameters associated with a user, the set of parameters including user profile parameters and queries structure parameters, wherein the user profile parameters include scheduling attributes to indicate timings of database queries submissions, destination attributes to indicate at least one destination address of the user, and type attributes to indicate at least one destination device for the user to receive a results availability notification, and wherein the queries structure parameters include at least database access attributes to indicate the type of databases to access;

store results availability notifications;

store database queries results; and control the queries submissions against the databases using the user profile parameters and the queries structure parameters defined for the user, the results availability notifications using the user profile parameters defined for the user, and the database queries results histories based on the user profile parameters defined for the user.

13. A method for managing database queries, comprising:

defining a set of parameters associated with a user, the set of parameters including user profile parameters and queries structure parameters, wherein the user profile parameters include scheduling attributes to indicate timings of database queries submissions, destination attributes to indicate at least one destination address of the user, and type attributes to indicate at least one destination device for the user to receive a results availability notification, and wherein the queries structure parameters include at least database access attributes to indicate the type of databases to access;

storing results availability notifications;

storing database queries results; and controlling the queries submissions against the databases using the user profile parameters and the queries structure parameters defined for the user, the results availability notifications using the user profile parameters defined for the user, and the database queries results histories based on the user profile parameters defined for the user.

14. The method of claim 13 wherein the controlling further comprises formatting the results availability notifications.

15. The method of claim 13 wherein the controlling further comprises formatting the database queries results.

16. The method of claim 13 further comprising storing the user profile parameters and the queries structure parameters.

17. The method of claim 16 further comprising modifying at least one parameter of the stored user profile parameters.

18. The method of claim 16 further comprising modifying at least one parameter of the stored queries structure parameters.

19. The method of claim 16 further comprising deleting at least one parameter of the stored user profile parameters.

20. The method of claim 16 further comprising deleting at least one parameter of the stored queries structure parameters.

21. The method of claim 13 wherein the controlling further comprises modifying the database queries results histories.

22. The method of claim 13 wherein the controlling further comprises deleting at least one history of the database queries results histories.

23. The method of claim 13 used in a distributed data processing environment by a group of users submitting queries to a plurality of different types of databases.

* * * * *